United States Patent
Kim et al.

(10) Patent No.: US 8,903,391 B2
(45) Date of Patent: Dec. 2, 2014

(54) ADAPTIVE DATA COMMUNICATION CONTROL METHOD AND PORTABLE DEVICE FOR SUPPORTING THE SAME

(75) Inventors: Jin Yup Kim, Yongin-si (KR); Ki Soo Cho, Seoul (KR); Seung Hwan Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/247,164

(22) Filed: Sep. 28, 2011

(65) Prior Publication Data
US 2012/0077495 A1    Mar. 29, 2012

(30) Foreign Application Priority Data

Sep. 28, 2010 (KR) .................. 10-2010-0093636

(51) Int. Cl.
| | |
|---|---|
| *H04W 4/00* | (2009.01) |
| *H04W 28/18* | (2009.01) |
| *H04W 48/16* | (2009.01) |
| *H04W 48/18* | (2009.01) |
| *H04W 76/02* | (2009.01) |

(52) U.S. Cl.
CPC .............. *H04W 28/18* (2013.01); *H04W 48/16* (2013.01); *H04W 48/18* (2013.01); *H04W 76/02* (2013.01)
USPC ..................... 455/435.2; 455/432.1

(58) Field of Classification Search
USPC ............... 455/418–422.1, 432.1–444, 550.1, 455/552.1, 553.1, 556.1, 556.2, 557; 370/310.2, 328, 338, 351–356
See application file for complete search history.

(56) References Cited

U.S. PATENT DOCUMENTS

| | | | |
|---|---|---|---|
| 2004/0152462 A1* | 8/2004 | Hwang | ............. 455/432.1 |
| 2009/0088160 A1* | 4/2009 | Pani et al. | ............. 455/436 |
| 2010/0054231 A1 | 3/2010 | Dolganow et al. | |
| 2010/0118752 A1* | 5/2010 | Suzuki et al. | ............. 370/311 |
| 2011/0039559 A1* | 2/2011 | Yi et al. | ............. 455/435.2 |
| 2011/0319064 A1* | 12/2011 | Lenart et al. | ............. 455/418 |

FOREIGN PATENT DOCUMENTS

WO      2010/054391 A2     5/2010

OTHER PUBLICATIONS

Research in motion Limited et al: "Fast Dormancy: A way forward" 3GPP draft; R2-085134, 3rd generation partnership project (3GPP), Mobile Competence Centre; Sep. 23, 2008.

* cited by examiner

Primary Examiner — San Htun
(74) Attorney, Agent, or Firm — Jefferson IP Law, LLP

(57) ABSTRACT

A method and a portable device for supporting an adaptive data communication control are provided. The device includes a memory unit, a control unit, and a radio frequency unit. The memory unit stores a table that contains data communication setting information corresponding to each service operator network. The control unit performs a Public Land Mobile Network (PLMN) selection after entering into a service area of specific service operator network, and receives Mobile Country Code/Mobile Network Code (MCC/MNC) information from the specific service operator network while the PLMN selection is being performed. The control unit extracts the data communication setting information corresponding to the MCC/MNC information from the table, and establishes a data communication connection with the specific service operator network according to the extracted data communication setting information. The radio frequency unit performs the established data communication with the specific service operator network under the control of the control unit.

19 Claims, 4 Drawing Sheets

ADAPTIVE DATA COMMUNICATION CONTROL METHOD AND PORTABLE DEVICE FOR SUPPORTING THE SAME

PRIORITY

This application claims the benefit under 35 U.S.C. §119(a) of a Korean patent application filed on Sep. 28, 2010 in the Korean Intellectual Property Office and assigned Serial No. 10-2010-0093636, the entire disclosure of which is hereby incorporated by reference.

BACKGROUND OF THE INVENTION

1. Field of the Invention

The present invention relates to a portable device. More particularly, the present invention relates to an adaptive data communication control method and portable device which allow for an update of data communication setting information and also allow an update of fast dormancy information according to a Public Land Mobile Network (PLMN) selection.

2. Description of the Related Art

Recently an increased variety of portable devices providing mobility and various useful functions have become available due to increasingly popular mobile services. A mobile communication device, a Personal Digital Assistant (PDA), and other similar mobile electronic devices are portable devices. A mobile communication device is equipped with a module for supporting mobile communication functions and operations in order to provide voice and data communications with other mobile communication devices through a base station. A PDA has a Central Processing Unit (CPU), a memory, an Operating System (OS), various programs that operate in conjunction with the OS, and specific elements and items, and may perform information gathering, storing, creating and searching or other similar operations. Similar to a PDA, a portable device of the related art supports a mobile communication function and/or supports a specific user function based on various programs stored in the memory. Additionally, the portable device of the related art supports operations based on a subscriber module, such as a Subscriber Identity Module (SIM) or other suitable subscriber module elements, disposed in the portable device of the related art. For the convenience of description, the subscriber module will be referred to as a SIM.

The portable device of the related art accesses a network provided by a specific service operator or provider, depending on data communication setting information stored in the SIM, and then sends or receives information of the data communication. This portable device may change access to a network of other service operators for reasons such as roaming or other suitable reasons. In this case, data communication setting information offered by a current service operator may be different from that offered by the former service operator. This difference may cause a problem that the portable device fails to perform a proper data communication. Furthermore, inconsistency in data communication setting information between service operators may give rise to various restrictions in a data communication, thus, a portable device of the related art may have difficulty in providing seamless communication services between service operators.

BRIEF SUMMARY OF THE INVENTION

Aspects of the present invention are to address at least the above-mentioned problems and/or disadvantages and to provide at least the advantages described below. Accordingly, an aspect of the present invention is to provide a proper data communication of a portable device by allowing an update of data communication setting information according to each service operator.

Another aspect of the present invention is to reduce power consumption of a portable device by applying fast dormancy to an update of data communication setting information.

According to an aspect of the present invention, an adaptive data communication control method of a portable device is provided. The method includes storing a table containing data communication setting information defined for each of a plurality of service operator networks, performing a PLMN (Public Land Mobile Network) selection after entering into a service area of a specific service operator network, receiving Mobile Country Code/Mobile Network Code MCC/MNC) information from the specific service operator network while the PLMN selection is being performed, extracting the data communication setting information corresponding to the MCC/MNC information from the table, and establishing a data communication connection with the specific service operator network according to the extracted data communication setting information.

According to another aspect of the present invention, a portable device for supporting an adaptive data communication control is provided. The device includes a memory unit for storing a table containing data communication setting information corresponding to each of a plurality of service operator networks, a Radio Frequency (RF) unit for establishing a data communication connection with the specific service operator network; and a control unit for performing a Public Land Mobile Network (PLMN) selection after entering into a service area of a specific service operator network, for receiving Mobile Country Code/Mobile Network Code (MCC/MNC) information from the specific service operator network while the PLMN selection is performed, for extracting the data communication setting information corresponding to the MCC/MNC information from the table, and for controlling the RF unit to establish a data communication connection with the specific service operator network corresponding to the extracted data communication setting information.

According to an aspect of the present invention, an adaptive data communication control method of a portable device is provided. The method includes performing a Public Land Mobile Network (PLMN) selection after entering into a service area of a specific service operator network, receiving new Mobile Country Code/Mobile Network Code (MCC/MNC) information from the specific service operator network while the PLMN selection is being performed, comparing the existing MCC/MNC information with the new MCC/MNC information, acquiring new data communication setting information corresponding to the new MCC/MNC information if the new MCC/MNC information does not match the existing MCC/MNC information, and updating stored data communication setting information with the new data communication setting information corresponding to the new MCC/MNC information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the present invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portable device, according to exemplary embodiments of the present invention, is capable of roaming through and between networks of different service operators or providers and may be a variety of electronic devices, such as information and communication equipment, multimedia players, and application equipment, International Mobile Telecommunication 2000 (IMT-2000) devices, Time Division Multiple Access (TDMA) devices, Global System for Mobile Communication (GSM) devices, Code Division Multiple Access (CDMA) devices, Universal Mobile Telecommunication Service (UMTS) devices, Wideband Code Division Multiple Access (WCDMA) devices and other similar or suitable electronic devices.

In this disclosure, a Public Land Mobile Network (PLMN) of a mobile communication operator that a user of a portable device is subscribed to will be referred to as a Home PLMN (HPLMN), and a PLMN of another mobile communication operator will be referred to as a Visited PLMN (VPLMN).

Figure 1:
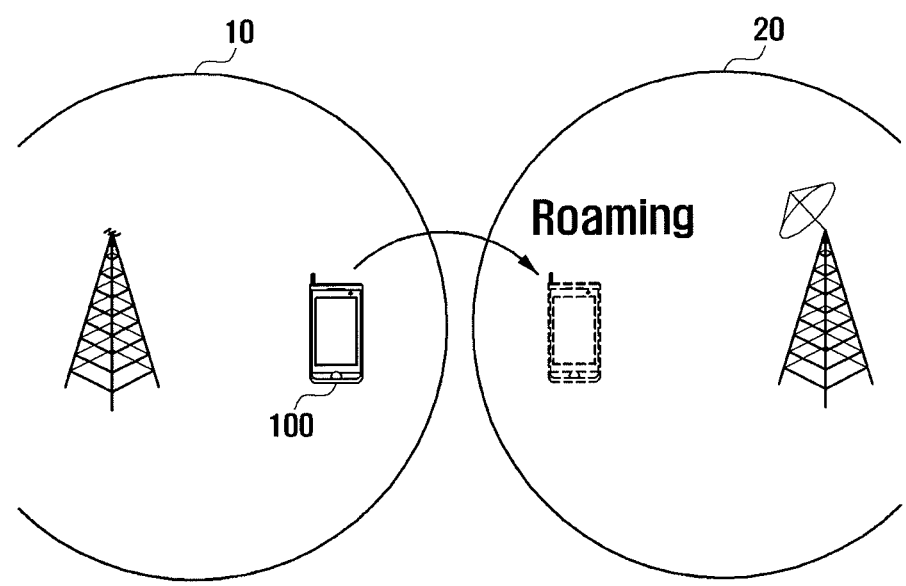
FIG. 1 is a schematic view illustrating the configuration of a network system for an adaptive data communication control in accordance with an exemplary embodiment of the present invention.

FIG. 1 is a schematic view illustrating the configuration of a network system for an adaptive data communication control in accordance with an exemplary embodiment of the present invention.

Referring to FIG. 1, the network system according to the present exemplary embodiment may include a first service operator network 10, a second service operator network 20, and a portable device 100. Although only two service operator networks are shown in FIG. 1, aspects of the present invention are not limited thereto, and there may be any suitable number of service operator networks included in the network system.

In the network system of FIG. 1, the portable device 100 is operating in the first service operator network 10 and then moves to the second service operator network 20. Namely, the portable device 100 regards the first service operator network 10 as the HPLMN and the second service operator network 20 as the VPLMN.

The first service operator network 10 is the HPLMN of the portable device 100. Therefore, when the portable device 100 is camping on the first service operator network 10, the portable device 100 may be accepted depending on whether the portable device 100 is a subscriber of a service provided by the first service operator network 10. Additionally, the first service operator network 10 may grant an identification number required for communication with the portable device 100 in order to support a mobile communication function of the portable device 100. The first service operator network 10 may also support a communication channel with the portable device 100. Furthermore, the first service operator network 10 may provide system information containing a Mobile Country Code (MCC) and a Mobile Network Code (MNC), corresponding to a PLMN IDentifier (ID), to the portable device 100 through a base station that is searched by the portable device 100. The first service operator network 10 may include a plurality of base stations and a base station controller for controlling each of the base stations. The portable device 100 may include a Subscriber Identity Module (SIM) at the time when the portable device 100 subscribes to a mobile communication service through the first service operator network 10, and may also be camping on the first service operator network 10 after searching for base stations of the first service operator network 10 according to information stored in the SIM.

When the second service operator network 20 is visited by the portable device 100 which is capable of a roaming between service operator networks, the second service operator network 20 corresponds with a visited network that was previously supporting a mobile communication function of the portable device 100. The second service operator network 20 may acquire necessary information from the visited network when the portable device 100 requests a roaming service, and may perform an information exchange for supporting a mobile communication function when the portable device 100 enters the second service operator network 20 and performs a search for a base station. The second service operator network 20 provides system information containing a MCC and a MNC corresponding to the PLMN ID to the portable device 100. Then the portable device 100 may determine the data communication setting information supported by the second service operator network 20 from the MCC and MNC information received from the second service operator network 20. Then, the portable device 100 may update the data communication setting information, and may perform data communication according to the updated data communication setting information.

The portable device 100 may become a subscriber of a first service operator that manages the first service operator network 10, and may be equipped with a SIM received from the first service operator. The SIM stores information related to various services such as a voice call service, a video call service, data communication services and other similar information regarding the portable device 100 being subscribed to the first service operator network 10. Particularly, the SIM includes a memory to store the PLMN ID information, namely including the MCC and the MNC, of the first service operator network 10. When the SIM is inserted into the portable device 100 and a boot-up process is performed, the portable device 100 searches for a neighboring base station, namely a base station disposed in the first service operator network 10, and receives system information from the base station of the first service operator network 10. The portable device 100 may compare the MCC and MNC information contained in the received system information with information stored in the SIM. In a case of the information matching or new information being available, the portable device 100 may camp onto the first service operator network 10. Thereafter, the portable device 100 receives a unique number, e.g., an Internet Protocol (IP) number, or any other suitable identification number, from the first service operator network 10, and may perform data communication based on the received number.

The portable device 100 may enter into a service area offered by the second service operator network 20. If a coverage area of the first service operator network 10 fails to extend into a coverage are of the second service operator network 20, or if there is a need for a handover to the second service operator network 20, a user of the portable device 100 may request a roaming service as it enters into the service area of the second service operator network 20. A user's portable device 100 may receive the identification number so as to still perform the mobile communication function while in the second service operator network 20. After entering into the second service operator network 20, the portable device 100 may receive system information containing the PLMN ID, namely the MCC and the MNC information, of the second service operator network 20 in a signal transmission and reception process that is for the portable device 100 to camp on a base station disposed in the second service operator network 20. Then the portable device 100 may determine the MCC and the MNC information contained in the received system information, and may determine data communication setting information that is matched with the MCC and the MNC information, and may update the data communication setting information.

Particularly, the portable device 100 may determine fast dormancy information matched with the MCC and the MNC information and then may update fast dormancy information to match the fast dormancy information to the second service operator network 20. Fast dormancy information may contain timing information for releasing a Radio Resource Control (RRC) to be used when the portable device 100 performs data communication with the network. Namely, fast dormancy information includes information that indicates whether the portable device 100 is allowed to perform a RRC release in a data communication process and, if the RRC release is allowed, information on when the RRC release is performed.

Normally, in a case of a service operator network that fails to provide fast dormancy, a RRC release is performed according to the control of the service operator network. In this case, the network performs the RRC release for a relatively long time, depending on a data communication maintenance policy or a radio resource recovery policy. A fast dormancy policy may be differently established for each service operator, or any particular operator may be not supported by such a policy. For this reason, if fast dormancy is not properly established for each individual service operator in the portable device 100, data communication may not be performed through any appropriate service operator network or, even if successfully performed, any specific restriction may be caused.

Additionally, since the portable device 100 may fail to update data communication setting information or fail to recognize the need for an update of the data communication setting information even though the portable device 100 is entering into another service operator network by means of roaming, unnecessary power consumption or unknown restrictions in a data communication may be imposed upon communication conducted with and by the portable device 100. Therefore, the portable device 100 of the present exemplary embodiment may store information about the data communication setting supported by a specific service operator network and also update the data communication setting of a current service operator network in response to its movement between networks, so that a proper data communication may be performed. The information about the data communication setting may be stored in the form of a table or any other suitable form of storing the data. Additionally, even though a user does not electively set up fast dormancy, the portable device 100 may determine whether a current service operator network supports a fast dormancy policy, may support the data communication setting, and thereby may decrease power consumption.

Meanwhile, although the data communication setting information may be updated at a time when the PLMN ID is changed due to a roaming service as discussed above, aspects of the present invention are not limited thereto. Alternatively, the portable device 100 of the present exemplary embodiment supports an update of the data communication setting information at a time of the PLMN selection. Related examples will be described below. Now, the configuration of the portable device 100 will be described in detail with reference to the drawings.

Figure 2:
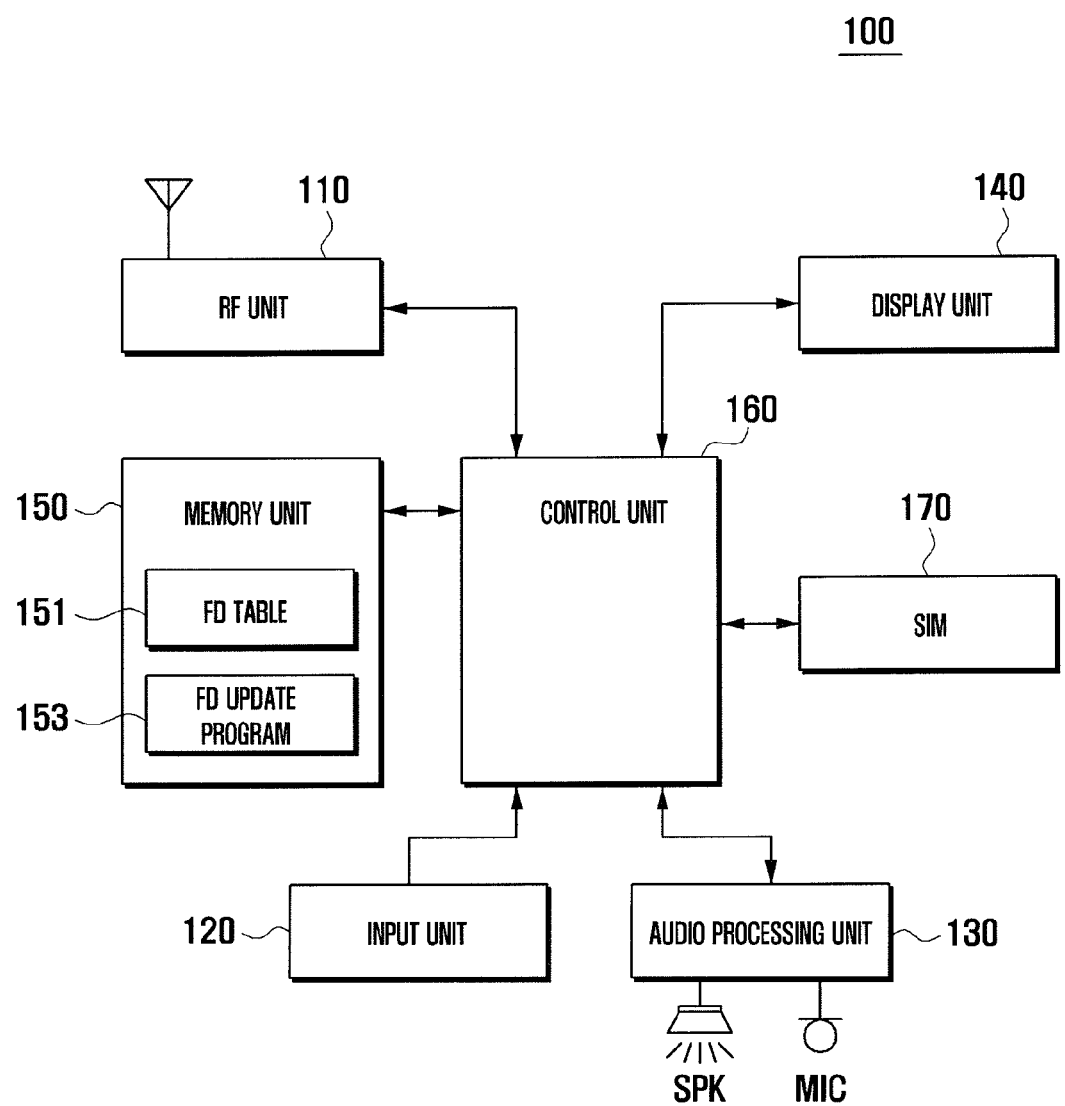
FIG. 2 is a block diagram illustrating the configuration of a portable device in accordance with an exemplary embodiment of the present invention.

FIG. 2 is a block diagram illustrating the configuration of a portable device in accordance with an exemplary embodiment of the present invention.

Referring to FIG. 2, the portable device 100 may include a Radio Frequency (RF) unit 110, an input unit 120, an audio processing unit 130, a display unit 140, a memory unit 150, a SIM 170, and a control unit 160.

The portable device 100 having the above-specified elements may perform an update of data communication setting information based on the MCC and the MNC information received from a current service operator network when performing a PLMN selection by searching for a neighboring base station in a boot-up process after an insertion of the SIM 170. The portable device may also update the data communication setting information by performing the PLMN selection after a reinsertion of the SIM 170, or by performing the PLMN selection after a roaming process and entrance into other service operator network. Additionally, the portable device may also update the data communication setting information by performing the PLMN selection by indicating another service operator network according to a user's control. For this, the portable device 100 acquires data communication setting information supported by each service operator network, stores such information as a table, and performs data communication according to related data communication settings, such as a fast dormancy setting, based on the stored table information. Now, each individual element of the portable device 100 will be described in detail.

The RF unit 110 forms a communication channel for a voice call, for transmission of image data, for data transmission, or for transmitting and receiving other similar communication data or information under the control of the control unit 160. Namely, the RF unit 110 establishes a voice call channel, a video call channel, a data communication channel, or other similar call or communication channels with a service operator network. For this, the RF unit 110 may include an RF transmitter that up-converts the frequency of an outgoing signal to a transmission frequency and then amplifies the signal, an RF receiver that amplifies an incoming signal and down-converts the frequency of the received signal, and other similar items or elements for the transmitting and/or receiving RF signals.

The RF unit 110 receives system information from a base station disposed in a specific service operator network and delivers the received system information to the control unit 160. Additionally, the RF unit 110 supports formation of a data communication channel with a selected service operator network, depending on data communication setting information that corresponds to the MCC and the MNC information contained in the system information. Moreover, depending on whether there is a fast dormancy setting, the RF unit 110 determines a RRC release timing of a data communication channel. If entering into a service operator network that fails to support the fast dormancy setting, the RF unit 110 may not perform fast dormancy and may perform the RRC release in a data communication process according to the control of the network.

The input unit 120 includes a plurality of input keys and function keys for receiving a user's input action or command and to set various functions. The function keys include navigation keys, side keys, shortcut keys, and any other special keys defined to perform particular functions. Additionally, the input unit 120 receives the user's key manipulation for controlling the portable device 100, creates a corresponding input signal, and then delivers the input signal to the control unit 160. Particularly, depending on a user's manipulation, the input unit 120 may create an input signal for rebooting the portable device 100 that may require a PLMN selection, an input signal for instructing a communication through a specific service operator network, an input signal for requesting a roaming service, or other similar input signals or other signals, and then deliver the input signal to the control unit 160.

The audio processing unit 130 includes a speaker SPK for outputting or transmitting audio signals of currently playing content or audio signals received through a communication channel, and a microphone MIC for receiving a user's voice or other audio signals. Particularly, the audio processing unit 130 outputs an alerting sound when a PLMN selection is performed. Additionally, when a data communication setting is modified in a PLMN selection process, the audio processing unit 130 may output a related alerting sound or voice guidance that explains the modification of the data communication setting. Moreover, when a fast dormancy setting is modified in a modification of the data communication setting, the audio processing unit 130 outputs a related alerting sound or voice guidance under the control of the control unit 160. However, aspects of the present invention are not limited thereto, and other suitable processes, operations or methods may be used to alert the user of the modification of the data communication setting, such as a visual notification displayed on the display unit 140. The above output of an alerting sound or voice guidance may be omitted or varied according to the user's setting or a device designer's intention.

The display unit 140 displays information, including various menus of the portable device 100, wherein the information is inputted by a user or offered to a user by the portable device 100. Namely, the display unit 140 displays a variety of screen views or graphics in connection with the use of the portable device 100, such as an idle screen, a menu screen, a message writing screen, a call screen, and other similar screens displaying similar information. The display unit 140 may be a Liquid Crystal Display (LCD), an Organic Light Emitting Diode (OLED) display, or any other suitable display screen. When the display unit 140 is fabricated to be a touch screen, the display unit 140 acts as an input unit as well. Particularly, the display unit 140 displays a screen related to signal transmission and reception in a PLMN selection process on which the user provides an input by touching corresponding display elements graphically displayed on the display unit 140.

Also, when the data communication setting is modified in a PLMN selection process, the display unit 140 outputs a related message or icon. The related message or icon indicates a modification of data communication setting and is outputted in an indicator region of the display unit 140 that is normally used for displaying a battery level, network strength or other similar operational information. Moreover, when the fast dormancy setting is modified in the modification process of the data communication setting, the display unit 140, under the control of the control unit 160, outputs a guidance message that explains the modification of the data communication setting. Additionally, the display unit 140 displays a screen interface that allows a user to select a service operator network. When the SIM 170 is inserted into or removed from the portable device 100, the display unit 140 outputs a related alert message. Also, when the portable device 100 newly enters into any service operator network corresponding to a previously visited network and then performs a PLMN selection, the display unit 140 outputs a message that announces a start of a roaming service.

The memory unit 150 stores applications providing functions for the operation of the portable device 100, such as applications for supporting a call service, applications for operating the SIM 170 connected to a SIM card interface, other applications like games, mapping services, social networking applications, and any other similar applications, operations and computer programs. The memory unit 150 consists of a program region and a data region. However, the present invention is not limited thereto and the memory unit 150 may be divided or not divided in any suitable manner.

In more detail, the program region stores an Operating System (OS) for boot up and operating the portable device 100, and applications for performing various optional functions such as a sound output function, an image viewer function, or a video player function. The OS, in a boot process of the portable device 100, determines whether a specific SIM 170 is inserted into the SIM card interface, and then performs a mobile communication service routine designed for supporting a mobile communication service based on the specific SIM 170. Also, the OS supports a PLMN selection process with a base station residing in a specific service operator network, wherein the base station is searched for in a boot process. Particularly, the program region stores any program for supporting an automatic modification of a data communication setting, especially a Fast Dormancy (FD) update program 153 for updating a fast dormancy setting.

The FD update program 153 is loaded into the control unit 160 during a boot process and includes a routine for extracting the MCC and the MNC information from system information received from the base station, and a routine for extracting the MCC and the MNC information from the SIM 170. The FD update program 153 also includes a routine for comparing the MCC and the MNC information extracted from the system information with the MCC and the MNC information extracted from the SIM 170, and a routine for updating or maintaining a current fast dormancy setting according to the comparison results. Also, the FD update program 153 supports an update of an FD table 151 stored in the data region of the memory unit 150. The FD update program 153 may contain a routine for receiving an FD table 151 from any external entity, such as an update manager of the portable device, and a routine of comparing a version of the received FD table 151 with a version of a stored FD table 151 and, if a new version is received, replacing the stored FD table 151 by the received FD table 151. This update of the FD table 151 may be carried out in a way of firmware upgrade or other suitable processes or operations, and hence the update is conducted in a background processing under the control of the update manager.

The data region of the memory unit 150 stores data created or received while the portable device 100 is used, for example, recorded sound or video data, phonebook data, music files, text, or any other similar information and data. Particularly, the data region may store the FD table 151. The FD table 151 stores information about a fast dormancy policy of each service operator network. Namely, the FD table 151 contains the MCC and the MNC information for each service operator network and the fast dormancy setting information supported by each service operator network. The MCC and the MNC information may be classified according to a country or the service operator network. For instance, the MCC of Australia is 505, the MCC of Austria is 232, the MCC of Belgium is 206, the MCC of Denmark is 238, and the MCC of Finland is 244. The MCC number is uniquely assigned to each country. The MNC is a unique number assigned to each service operator network. For instance, the MNC of Telecom Australia in Australia is 01, the MNC of MNC of Optus Communication, which is also in Australia, is 02, and the MNC of Vodafone in the same country is 03. Similarly, the MCC and the MNC, expressed as the MCC/MNC, of Korean service operator KTF is 450/02, and the MCC/MNC of SKT is 450/05.

The MNC of the same service operator network may be varied according to frequency band. For instance, 450/02 is the MCC/MNC of KTF using a CDMA 1700 MHz band, whereas 450/04 is the MCC/MNC of KTF using a CDMA 850 MHz band. Therefore, the MCC/MNC may be uniquely assigned to each service operator network according to the service operator network area and characteristics. Also, each data communication setting, namely a fast dormancy setting, may be different according to the MCC/MNC. The FD table 151 records data communication setting information, especially the fast dormancy setting information, for each MCC/MNC. The fast dormancy setting information may contain fast dormancy on/off information that indicates whether any service operator network having the MCC and the MNC information offers fast dormancy, and any other parameter information such as RRC release timing information, such as an RCC release at a lapse of two or five seconds after a specific signal is transmitted or received.

The SIM 170 is an Integrated Circuit (IC) chip and may be inserted into various types of portable devices. The SIM 170 stores subscriber data so that the SIM 170 uses user related functions offered by the portable device 100 after being inserted into the portable device 100. The portable device 100 has a slot suitable for receiving the SIM 170, such as the SIM card interface. When the SIM 170 is inserted into the slot, the portable device 100 supplies power to the SIM 170. Then the SIM 170 performs an initialization process and communicates with the control unit 160 to send and receive data to and from the control unit 160. At this time, the portable device 100 controls a PLMN selection based on the SIM 170.

The control unit 160 controls power supplied to the portable device 100 and initializing process for each element of the portable device 100. After initializing each element, the control unit 160 controls each element of the portable device 100 to perform a PLMN selection and an update or maintenance of data communication setting information.

Figure 3:
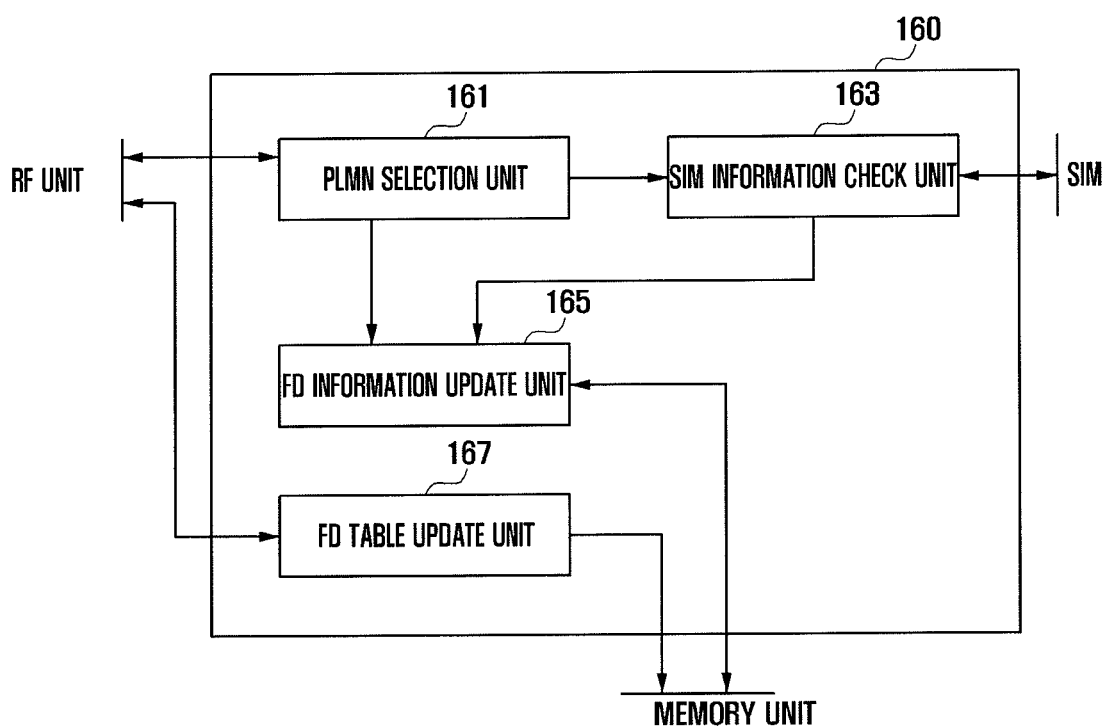
FIG. 3 is a block diagram illustrating a detailed configuration of the control unit shown in FIG. 2 in accordance with an exemplary embodiment of the present invention.

FIG. 3 is a block diagram illustrating a detailed configuration of the control unit shown in FIG. 2 in accordance with an exemplary embodiment of the present invention. Referring to FIG. 3, the control unit 160 includes a PLMN selection unit 161, a SIM information check unit 163, an FD information update unit 165, and an FD table update unit 167.

The PLMN selection unit 161 sends and/or receives a variety of signals required for the PLMN selection process of the portable device 100. For this, the PLMN selection unit 161 determines whether conditions of the PLMN selection are satisfied. Namely, the PLMN selection unit 161 determines whether a search for a neighboring base station is performed in the boot process after an insertion of the SIM 170 and whether a search for the neighboring base station is performed in a reboot process after a reinsertion of the SIM 170. Additionally, the PLMN selection unit 161 determines whether a handover of the portable device 100 to another service operator network occurs after a request for roaming, or whether there is an input signal for selecting another service operator network according to a user's manipulation.

Additionally, the PLMN selection unit 161 performs a PLMN selection when one of the above conditions is satisfied, and may receive system information from a base station through the RF unit 110 during a PLMN selection process. The PLMN selection unit 161 extracts the MCC and the MNC information corresponding to the PLMN ID of the base station from the received system information. After the extraction, the PLMN selection unit 161 provides the extracted MCC and MNC information to the FD information update unit 165 and also informs the SIM information check unit 163 of the extracted MCC and MNC information.

The SIM information check unit 163 receives notification that the PLMN selection unit 161 delivers the MCC and the MNC information to the FD information update unit 165, extracts the MCC and the MNC information from the SIM 170, and delivers the extracted MCC and MNC information to the FD information update unit 165. Here, the MCC and the MNC information stored in the SIM 170 may be the MCC and the MNC information of a service operator network to which the portable device 100 initially subscribes.

The FD information update unit 165 compares the MCC and the MNC information received from the PLMN selection unit 161 with the MCC and the MNC information in the SIM 170. If two pieces of the MCC and the MNC information are identical to each other, then the FD information update unit 165 recognizes that a service operator network is not changed and therefore maintains the data communication setting information. If the MCC and the MNC information are not identical, then the FD information update unit 165 recognizes that a service operator network is changed and therefore determines the data communication setting information corresponding to the MCC and the MNC information received from the PLMN selection unit 161. For this, the FD information update unit 165 may load the FD table 151 stored in the data region and may acquire the data communication setting information from the FD table 151. Additionally, the FD information update unit 165 replaces existing data communication setting information with new data communication setting information acquired from the FD table 151.

The FD table update unit 167 controls an updating of the FD table 151 stored in the data region of the memory unit 150. Data communication setting information stored in the FD table 151 may be varied according to a policy change of each service operator that supports a mobile communication service. If a policy of any service operator is changed, then a fast dormancy setting applied to the service operator network may be removed or parameter values of the fast dormancy setting may be modified. Accordingly, a server that provides the FD table 151 acquires information about a modification of the data communication setting information for each service operator and then creates a new FD table based on the acquired information. Also, this server creates a blacklist of service operators that fail to support fast dormancy, apply the blacklist to the new FD table, and send the new FD table to each portable device 100. Then the FD table update unit 167 may check a version of the FD table received through the RF unit 110 and, if a new version is received, replace the stored FD table 151 by the received FD table.

As discussed above, the portable device 100 for an adaptive data communication control according to an exemplary embodiment of the present invention includes the FD table 151 having data communication setting information for each service operator that contains a fast dormancy setting or a fast dormancy parameter setting. When entering into any service operator network, the portable device 100 modifies information depending on data communication settings supported by the service operator network. Therefore, the portable device of this invention automatically updates data communication setting information without requiring a user's input, and may also rapidly release an RRC requiring high power consumption in a data communication process by supporting a fast dormancy function.

Next, an adaptive data communication control method that is performed in the above-discussed portable device 100 will be described in detail with reference to the drawings.

Figure 4:
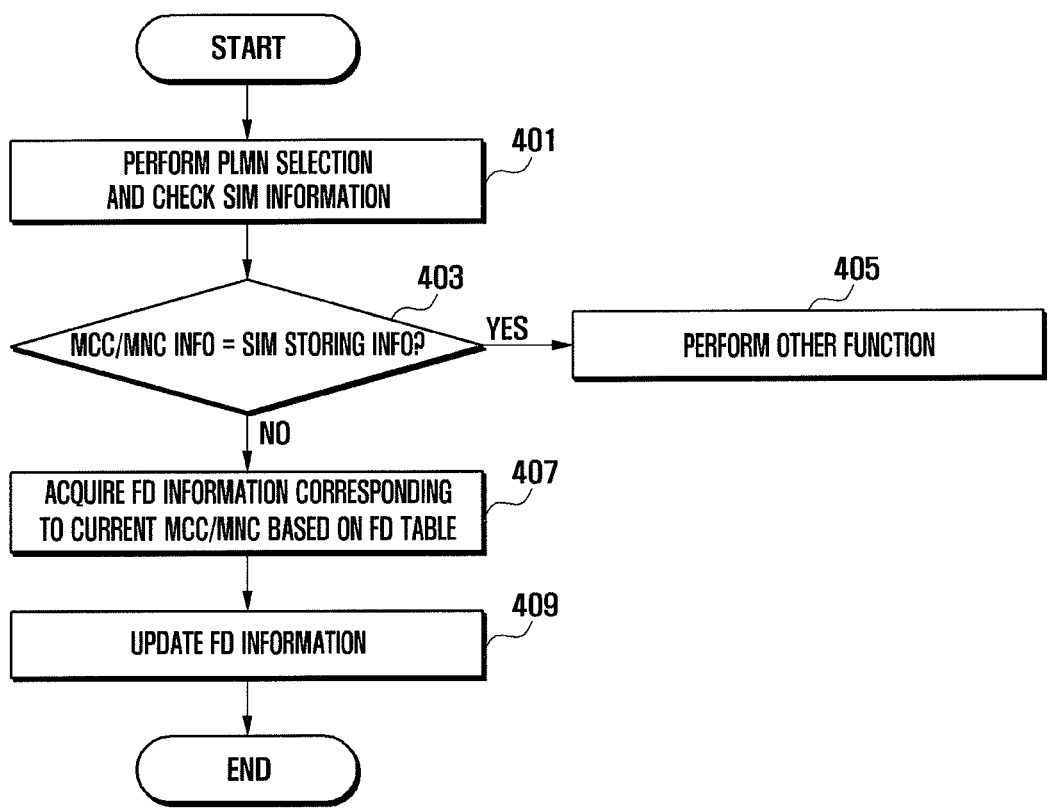
FIG. 4 is a flow diagram illustrating an adaptive data communication control method in accordance with an exemplary embodiment of the present invention.

FIG. 4 is a flow diagram illustrating an adaptive data communication control method in accordance with an exemplary embodiment of the present invention.

Referring to FIG. 4, the control unit 160 of the portable device 100 performs a PLMN selection and checks SIM information in step 401. For this, the control unit 160 determines whether a search for a neighboring base station is performed in a boot process after insertion of the SIM 170 into the portable device 100, or determines whether a search for a neighboring base station is performed in a reboot process after a reinsertion of the SIM 170. Also, the control unit determines whether a handover to another service operator network occurs after a request for a roaming, or whether there is an input signal for selecting the other service operator network according to a user input. If an event corresponding to one of the above conditions occurs, the control unit 160 performs a PLMN selection process and also checks information stored in the SIM 170 in step 401. The PLMN selection process selects a base station residing in a specific service operator network that is searched by the portable device 100. In this process, the control unit 160 receives system information containing the MCC and the MNC information from the selected base station. Additionally, in this step 401, the control unit 160 may extract the MCC and the MNC information from the received system information and also extract the MCC and the MNC information from the SIM 170.

Next, the control unit 160 determines whether the MCC and the MNC information acquired in the PLMN selection process is equal to the MCC and the MNC information extracted from the SIM 170 in step 403. If two pieces of the MCC and the MNC information are equal to each other, the control unit 160 recognizes that the device is located in the same service operator network where the device was located before the PLMN selection process, and therefore stops a data communication setting process. Then the control unit 160 performs other functions of the portable device 100 in response to a user's input in step 405. For instance, depending on the user's input, the control unit 160 may perform a call function, a data communication function, a file playback function, a file search function, a message transmission function, and or other similar functions which are offered by the portable device 100.

If the two pieces of the MCC and the MNC information are not equal to each other, as determined in step 403, then the control unit 160 acquires data communication setting information, such as fast dormancy information, corresponding to the MCC and the MNC information extracted from the received system information, from the FD table 151 in step 407.

Then the control unit 160 controls an update of the fast dormancy information in step 409. Namely, the control unit 160 replaces existing data communication setting information with new data communication setting information acquired from the FD table 151 in step 407.

As discussed above, the adaptive data communication control method of the portable device 100 according to exemplary embodiments of the present invention allows data communication setting information to be set according to each service operator and to be updated corresponding to a current service operator network where the portable device 100 is located. Therefore, when a service operator network is changed, the portable device 100 automatically performs a setting of the data communication setting information regardless of a user's control. Particularly, by adaptively establishing a fast dormancy for each service operator network, the portable device 100 performs a rapid RRC release in any network supporting fast dormancy and therefore may considerably reduce power consumption in a data communication process.

Meanwhile, although in the above discussion the control unit 160 of the portable device 100 extracts the MCC and the MNC information from the SIM 170 and then compares it with the MCC and the MNC information obtained in the PLMN selection process, the present invention is not limited thereto. Alternatively, regardless of the extraction of the MCC and the MNC information from the SIM 170, the control unit 160 may verify data communication setting information matched with the MCC and the MNC information obtained in the PLMN selection process, based on a table, such as the FD table 151, which contains data communication setting information supported by each service operator network.

Then the control unit 160 supports a data communication setting of the portable device 100 on the basis of the verified data communication setting information. Therefore, the comparing of the MCC and the MNC information stored in the SIM 170 and the MCC and the MNC information obtained from system information may be an optional process for suppressing a search process for the FD table 151 and a process for setting the data communication settings which may be repeated when the same PLMN is selected. Additionally, a data communication setting process may include setting at least one of a fast dormancy on/off and a RRC release timing of the fast dormancy as discussed above.

The portable device 100 may essentially or selectively include any other elements. For instance, the portable device 100 may further include a short range communication module, a digital camera module, a wired or wireless data transmission interface, an Internet access module, a digital broadcast receiving module, and other similar modules or elements. Such elements may be varied, modified and improved in various ways, and any other elements equivalent to the above elements may be additionally or alternatively equipped in the portable device 100. Meanwhile, as will be understood by those skilled in the art, some of the above-mentioned elements in the portable device 100 may be omitted or replaced with another.

Additionally, the portable device 100 of this invention may include any types of electronic devices that have a SIM and support a data communication functions through a base station. For instance, the portable device 100 may include mobile communication devices, multimedia players and their application equipment, especially including many mobile communication terminals based on various communication protocols, a Portable Multimedia Player (PMP), a digital broadcasting player, a Personal Digital Assistant (PDA), a music player, a portable game console, a smart phone, a notebook, a handheld personal computer, or other similar electronic devices.

While this invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. An adaptive data communication control method of a portable device, the method comprising:
    storing a table containing data communication setting information defined for each of a plurality of service operator networks, the data communication setting information including Fast Dormancy (FD) information corresponding to each of the plurality of service operator networks;
    performing a Public Land Mobile Network (PLMN) selection after entering into a service area of a specific service operator network;
    receiving Mobile Country Code/Mobile Network Code (MCC/MNC) information from the specific service operator network while the PLMN selection is being performed;
    identifying the data communication setting information, from the table, based on the MCC/MNC information;
    updating the data communication setting information including the FD information in the stored table; and
    performing a data communication connection with the specific service operator network using the updated data communication setting information including the FD information,
    wherein the FD information contains timing information for releasing a Radio Resource Control (RRC) of each of the plurality of service operator networks.

2. The method of claim 1, further comprising:
    extracting MCC/MNC information stored in a subscriber module;
    comparing the MCC/MNC information extracted from the subscriber module with the MCC/MNC information received in the PLMN selection;
    if the MCC/MNC information extracted from the subscriber module is equal to the MCC/MNC information received in the PLMN selection, stopping the performing of the data communication connection; and
    if the MCC/MNC information extracted from the subscriber module is different from the MCC/MNC information received in the PLMN selection, performing the data communication according to the MCC/MNC information received in the PLMN selection and extracted from the table.

3. The method of claim 1, wherein the table records a mapping relation between MMC/MNC information of each of the plurality of service operator networks and information about a FD on/off and a Radio Resource Control (RRC) release timing of each of the plurality of service operator networks.

4. The method of claim 3, wherein the performing of the data communication includes setting at least one of the FD on/off and the RRC release timing of the specific service operator network.

5. The method of claim 1, wherein the performing of the PLMN selection comprises at least one of:
    performing the PLMN selection while searching for a neighboring base station in a boot process after an insertion of the subscriber module into the portable device;
    performing the PLMN selection while searching for a neighboring base station during a reboot process after a reinsertion of the subscriber module into the portable device;
    performing the PLMN selection in response to a handover to another service operator network after a request for roaming; and
    performing the PLMN selection in response to an input signal for selecting the other service operator network according to a user's input.

6. The method of claim 1, further comprising:
    updating the stored table with modifications of the data communication setting information of each of the plurality of service operator networks.

7. A portable device for supporting an adaptive data communication control, the device comprising:
    a memory unit configured to store a table containing data communication setting information corresponding to each of a plurality of service operator networks, the data communication setting information including Fast Dormancy (FD) information corresponding to each of the plurality of service operator networks;
    a Radio Frequency (RF) unit configured to establish a data communication connection with the specific service operator network; and
    a control unit configured to perform a Public Land Mobile Network (PLMN) selection after entering into a service area of a specific service operator network, to receive Mobile Country Code/Mobile Network Code (MCC/MNC) information from the specific service operator network while the PLMN selection is performed, to identify the data communication setting information, from the table, based on the MCC/MNC information, to update the data communication setting information including the FD information in the stored table, and to control the RF unit to perform the data communication connection with the specific service operator network using the updated data communication setting information including the FD information,
    wherein the FD information contains timing information for releasing a Radio Resource Control (RRC) of each of the plurality of service operator networks.

8. The device of claim 7, further comprising:
    a subscriber module for storing the MCC/MNC information of a home network to which the device subscribes.

9. The device of claim 8, wherein the control unit comprises a FD information update unit for comparing the MCC/MNC information extracted from the subscriber module with the MCC/MNC information received in the PLMN selection, wherein, if the MCC/MNC information extracted from the subscriber module is equal to the MCC/MNC information received in the PLMN selection, the control unit is for stopping the performing of the data communication, and wherein, if the MCC/MNC information extracted from the subscriber module is different from the MCC/MNC information received in the PLMN selection, the control unit controls the RF unit to perform the data communication connection according to the MCC/MNC information received in the PLMN selection and the MCC/MNC information of the stored table.

10. The device of claim 7, wherein the stored table records a mapping relation between the MMC/MNC information of each of the plurality of service operator networks and information about a FD on/off and a Radio Resource Control (RRC) release timing of each service operator network.

11. The device of claim 10, wherein the control unit sets at least one of the FD on/off and the RRC release timing of the specific service operator network when performing the data communication connection.

12. The device of claim 7, wherein the control unit performs the PLMN selection while searching for a neighboring base station in a boot process after an insertion of the subscriber module, wherein the control unit performs the PLMN selection while searching for a neighboring base station in a rebooting process after a reinsertion of the subscriber module, wherein the control unit performs the PLMN selection in response to handover to another service operator network after a request for a roaming, and wherein the control unit performs the PLMN selection in response to an input signal for selecting another service operator network according to a user's input.

13. The device of claim 7, wherein the RF unit, when the data communication setting information of each service operator network is modified, receives a new table containing the modified data communication setting information from a specific server.

14. The device of claim 13, wherein the control unit updates the stored table that is stored in the memory unit by using the received new table.

15. An adaptive data communication control method of a portable device, the method comprising:

storing a table containing data communication setting information defined for each of a plurality of service operator networks, the data communication setting information including Fast Dormancy (FD) information corresponding to each of the plurality of service operator networks;

performing a Public Land Mobile Network (PLMN) selection after entering into a service area of a specific service operator network;

receiving new Mobile Country Code/Mobile Network Code (MCC/MNC) information from the specific service operator network while the PLMN selection is being performed;

identifying the data communication setting information, from the table, based on the MCC/MNC information;

comparing the existing MCC/MNC information with the new MCC/MNC information; and updating the data communication setting information including the FD information in the stored table, wherein the FD information contains timing information for releasing a Radio Resource Control (RRC) of each of the plurality of service operator networks.

16. The method of claim 15 further comprising performing operational functions of the portable device if the new MCC/MNC information matches the existing MCC/MNC information.

17. The method of claim 16, wherein the operational functions of the portable device includes at least one of a voice call, a data transmission, a data reception, a mapping function, a file playback function, a message transmission, and a message reception.

18. The method of claim 15, wherein the performing of the PLMN selection comprises verifying existing MCC/MNC information stored on a Subscriber Identity Module of the portable device.

19. The method of claim 15, wherein the acquiring of the new data communication setting information comprises updating the FD information from the FD table stored on the portable device.

* * * * *